US012749832B2

(12) United States Patent
Schoettle et al.

(10) Patent No.: US 12,749,832 B2
(45) Date of Patent: Sep. 29, 2026

(54) INTERCHANGEABLE SIGNAL DEVICE MODULAR CONNECTOR

(71) Applicant: WERMA Holding GmbH + Co. KG, Rietheim-Weilheim (DE)

(72) Inventors: Timo Schoettle, Renquishausen (DE); Ronny Lauer, Villingen-Schwenningen (DE)

(73) Assignee: WERMA HOLDING GMBH + CO. KG, Rietheim-Weilheim (DE)

( * ) Notice: Subject to any disclaimer, the term of this patent is extended or adjusted under 35 U.S.C. 154(b) by 289 days.

(21) Appl. No.: 18/105,193

(22) Filed: Feb. 2, 2023

(65) Prior Publication Data

US 2023/0291133 A1 Sep. 14, 2023

(30) Foreign Application Priority Data

Feb. 2, 2022 (DE) ..................... 10 2022 102 441.5

(51) Int. Cl.
*H01R 4/48* (2006.01)
*H01R 12/55* (2011.01)

(52) U.S. Cl.
CPC ......... *H01R 4/48275* (2023.08); *H01R 12/55* (2013.01)

(58) Field of Classification Search
CPC .... H01R 4/48275; H01R 12/55; H01R 12/00; H01R 4/4809; H01R 4/4815; H01R 4/4821; H01R 4/4826; H01R 4/4823; H01R 4/48; H01R 4/4842; H01R 4/4816; H01R 13/02; H01R 13/639; F21S 2/005; F21V 23/005; F21V 23/06
USPC ................................ 439/441, 268, 395, 440
See application file for complete search history.

(56) References Cited

U.S. PATENT DOCUMENTS

| | | | | |
|---|---|---|---|---|
| 6,074,242 | A * | 6/2000 | Stefaniu | H01R 4/4848 439/441 |
| 8,342,891 | B2 * | 1/2013 | Fukushi | H01R 13/506 439/441 |
| 10,134,246 | B2 * | 11/2018 | Schoettle | F21V 19/003 |

(Continued)

FOREIGN PATENT DOCUMENTS

| | | |
|---|---|---|
| DE | 196 14 988 A1 | 10/1997 |
| DE | 100 41 202 A1 | 3/2002 |

(Continued)

*Primary Examiner* — Tulsidas C Patel
*Assistant Examiner* — Carlos E Lopez-Pagan
(74) *Attorney, Agent, or Firm* — BRENEMAN & GEORGES

(57) ABSTRACT

The invention relates to a connection element for the interchangeable electrical connection of a signal device to a functional module adjacent to the connection element, such as a lighting module for signaling one or more different operating states of a technical device such as a machine, a plant, a vehicle as examples or a radio module for producing a radio connection of the signal device, wherein the connection element for the electrical connection of the functional module has at least one electrical contact surface of an electric conductor. The connection element is distinguished by the fact that the electric conductor having the contact surface extends as far as a cable connecting clamp of the connection element for the connection to at least one cable core of an electric cable.

15 Claims, 12 Drawing Sheets

(56) References Cited

U.S. PATENT DOCUMENTS

| | | | | |
|---|---|---|---|---|
| 2007/0178747 | A1* | 8/2007 | Schrader ................ | H01R 4/485 439/441 |
| 2011/0207361 | A1* | 8/2011 | Heckert ............... | H01R 4/4833 439/350 |
| 2015/0244090 | A1 | 8/2015 | Mostoller et al. | |
| 2016/0120024 | A1* | 4/2016 | Oguro .................... | H01R 12/57 174/250 |
| 2018/0248283 | A1* | 8/2018 | Ono ..................... | H01R 9/2425 |

FOREIGN PATENT DOCUMENTS

| | | | |
|---|---|---|---|
| DE | 10 2015 120 280 | A1 | 5/2017 |
| EP | 1 467 140 | B1 | 4/2004 |
| EP | 1 918 633 | A1 | 5/2008 |
| EP | 3 043 111 | A1 | 7/2016 |

* cited by examiner

INTERCHANGEABLE SIGNAL DEVICE MODULAR CONNECTOR

CROSS-REFERENCE TO RELATED APPLICATIONS

This application is related to and entitled to priority based on German Application Numbers 10 2022 134 962.4 and 10 2022 102 441.5.

STATEMENT REGARDING FEDERALLY SPONSORED RESEARCH AND DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A READ-ONLY OPTICAL DISC, AS A TEXT FILE OR AN XLM FILE VIA THE PATENT ELECTRONIC SYSTEM

Not applicable.

STATEMENT REGARDING PRIOR DISCLOSURES BY THE INVENTOR OR A JOINT INVENTOR

Not applicable.

SEQUENCE LISTING

Not applicable.

BACKGROUND OF THE INVENTION

(1) Field of the Invention

The invention relates to a connection element for the electrical connection of a signal device, in particular a visual signal device, to a functional module adjacent to the connection element, such as a lighting module, an acoustic module for signaling one or more different operating states of a technical device such as a machine, a plant, a vehicle or the like, or a radio module for producing a radio connection of the signal device, according to the preamble of Claim 1, and to a signal device having such a connection element.

(2) Description of Related Art Including Information Disclosed Under 37 CFR 1.97 and 1.98

Prior Art

Visual signal devices or signal towers have already been used for years in an extremely wide range of variants. Often, the "classic" signal tower with three replaceable interchangeable modules is used, which modules usually have the colors, red, yellow and green. Since signal towers are normally constructed modularly, it is entirely possible for additional interchangeable modules in the colors of blue or white, etc. to be accommodated or for individual interchangeable modules also to be removed again when operating conditions or applications/intended purposes change. Frequently, acoustic signal transmitters such as piezo disks or multi-tone generators or horns, etc., are integrated in the device, so that it is not only possible for visual but also acoustic signaling to be carried out, in particular by means of such interchangeable modules.

The modular, in particular visual, signal devices, are firstly what are known as "pre-configured" devices, wherein there is a fixedly specified unchangeable structure of the modules firmly connected to one another, for example in the colors red, yellow, green.

More widespread are the interchangeable modules that can be detached without tools and connected temporarily to one another in what are known as "non-preconfigured" devices or signal towers. Here, the individual modules, in particular lighting modules and/or acoustic modules, can be combined with one another as desired and also replaced or interchanged at a subsequent time without any tools. In this way, particularly high flexibility in the possible applications with standardized interchangeable modules is achieved. For example, it is subsequently possible for a "blue" stage or interchangeable module to be added and/or for a damaged or defective lighting module/interchangeable module to be replaced by a new, intact lighting module/interchangeable module without great effort.

This is of special advantage in particular in modern lighting modules having long-life LEDs and printed circuit boards/circuit boards since, as compared with the earlier frequently used incandescent lamps, it is not just the lighting means, which means the incandescent lamp, but nowadays, mostly-y for financial reasons, a repair is not considered in the case of damage to or destruction of the lighting means and/or the printed circuit boards/circuit boards; instead the entire interchangeable module/lighting module is replaced.

In particular in the modularly constructed signal towers having interchangeable modules, for many years "looping through" the power or energy supply of the individual modules with the aid of wires has been usual. Thus, according to DE 100 41 202 A1, for example a signal tower having up to five stages/lighting modules is described, wherein, in addition to the five separate energy supply or power lines/wires, in addition a negative pole or neutral conductor/wire is also present in each module and is "looped through" from stage to stage. This means that hitherto each interchangeable module/lighting module usually has six wires on the inner side of the dome, so that all the interchangeable modules of an up to five-stage signal tower are constructed in the same way and can be replaced by one another as desired.

In particular in the signal towers having interchangeable modules, there are high demands on these contact points and on making contact during replacement, which means mounting and/or disassembly of one of the modules/interchangeable modules. Thus, over the course of their lifetime, signal towers to some extent experience very frequent replacement of such modules or interchangeable modules, wherein making secure contact and thus the security of the energy supply between the modules that can be replaced without tools must be ensured under all circumstances.

EP 1 467 140 B1 discloses a signal tower which uses a board or circuit board which is oriented in the longitudinal direction of the signal tower. During operation and use, the printed circuit board is contacted permanently by wires. These wires extend radially outward toward the inner side of the dome, wherein in turn, on the inner side of the dome, the contact points which have to be detached for the disassembly of the respective module are made between two adjacent or between two detachably connectable interchangeable modules/modules. Thus here, too, making contact between the individual interchangeable modules/lighting modules, which has been usual for many years, is implemented with wires.

The document DE 10 2015 120 280 A1 has disclosed a further-developed signal device in which, to improve the contact of the interchangeable modules in the direction of the longitudinal axis, at least two detachably contactable electrical contact surfaces of the contact are arranged transversely relative to the longitudinal axis of the signal tower. Here, a contact surface on the end face of a printed circuit board is connected to a conductor track, and the other contact surface is formed as a surface of a contact spring serving as an electrical conductor that extends transversely relative to the longitudinal axis of the signal tower.

In this signal tower, a connection module for connection to external electric lines to a connecting clamp in the connection module is disclosed. The connecting clamp is attached to a printed circuit board. The connection module is in turn connected to a base module, which is used for the mechanical fixing of the signal tower. The electrical connection between the connecting clamp attached to the printed circuit board and the functional module located adjacent to the connection module is not described in detail.

BRIEF SUMMARY OF THE INVENTION

The object of the invention is to permit simple and reliable electrical connection of such a signal device to the external electric lines.

Starting from a connection element according to the preamble of Claim 1, this object is achieved by its characterizing features.

Accordingly, a connection element according to the invention is distinguished by the fact that the electric conductor having the contact surface for the connection of an adjacent functional module for the electrical connection of the contact surface to a cable core of an electrical cable extends as far as a cable connecting clamp of the connection element.

As a result of this configuration, structural elements located in between, such as wires, printed circuit boards or the like, are rendered superfluous and both connections of the connection element, i.e. both the connection to the adjacent functional element by the associated contact surface and the connection to an external cable, can be connected in one operation with the mounting of such an electric conductor. Both the number of parts needed and also the effort on mounting are considerably reduced hereby.

According to the invention, the electric conductor is formed as a one-piece spring element which, on the one hand, comprises the contact surface for the connection of the functional module and, on the other hand, comprises a cable clamping spring of the cable connecting clamp.

This embodiment offers relief when connecting the connection element Provided therewith to an external cable which, in this case, is to be brought about by simply inserting a ferrule or a wire end of a core. In such a case, one also speaks of a "push-in" clamp. In this case, the connection is in particular also possible without tools.

A particular embodiment of such a clamp is present when a passage for the insertion of a core end of a cable is provided in the cable clamping spring. As a result, the core end of a cable is clamped more stably and contacted more reliably. Such clamps are also designated "cage" clamps.

Further advantages are offered by a development of the invention in which a device for loosening the cable clamping spring is provided. In this case, the connection element or an associated signal device can be unclamped from The external cable in a simple manner.

The cable clamping spring can be loosened, for example, by an access for a separate tool being provided, such as a screwdriver for pressing the cable clamping spring or a permanently present loosening element, such as a movable lever or pressure plunger for pressing the cable clamping spring.

It is also advantageous if the contact surface for the adjacent functional module is a surface of a contact spring that springs transversely with respect to the contact surface and acts in the direction of a longitudinal axis of the connection element. Such a contact spring has already been tried and tested in embodiments in which the printed circuit board extending parallel to the longitudinal axis of the corresponding functional module has the mating contacts on the end face, so that the contact is made with the pressing of an end-face contact onto the contact spring. As a result of the configuration of the contact spring, compensation for tolerances during the connection of multiple parallel contacts also takes place via the possibility of different spring travels. The contact surface which springs in this way can be shaped to be flat or have chamfered sliding surfaces or ramps at the end for the sliding of the mating contacts of a corresponding printed circuit board.

If the contact spring for the adjacent functional module is electrically connected to the cable clamping spring, then, with the connection of the external cable to the cable camping spring, a connection that is ready for the adjacent functional module results immediately via the contact surface of the contact spring for the adjacent functional module.

The electrical connection of the contact surface of the contact spring for the adjacent functional module to the cable clamping spring is implemented, according to the invention, in that a one-piece spring element has the contact surface for the connection of the functional module and the cable clamping spring of the cable connecting clamp. Such a spring element carries out a dual function, in that it effects the connection both to the external cable and also to the adjacent functional module. A one-piece spring element combines this dual function with a further reduction in the number of parts needed and the necessary mounting steps.

The electrical connection of two or more electrical lines of the adjacent functional module is made possible by two or more identically shaped spring elements being provided as electrical conductors with contact surfaces for the adjacent functional module, wherein the contact surfaces are arranged beside one another and pointing in the direction of the longitudinal axis of the end element.

As a result of an arrangement of the contact surfaces for the adjacent functional module pointing in the direction of the longitudinal axis of the connection element, the invention can also be used in signal towers in which the connection of such an adjacent functional module is effected by end-face contact of a printed circuit board extending in the longitudinal direction of the connection element or the functional module to be connected thereto with one or more such contact surfaces.

In a development of such an embodiment, the contact surfaces of the electrical conductors are formed in the shape of strips and lie parallel to one another. In this refinement, the connection of a plurality of contact surfaces lying beside one another can be effected in a common movement, for example by pushing on and/or a rotational movement.

The electrical conductors formed as a one-piece spring element with the cable clamping spring and the contact surface can be shaped in the same way but arranged rotated relative to each other, the contact surfaces continuing to point in the direction of the longitudinal axis. If the one-piece spring elements formed as electrical conductors with the cable clamping spring and the contact surface for adjacent functional elements or modules is arranged to be rotated alternately through 180 degrees, then the contact surfaces can not only point jointly in the direction of the longitudinal axis but, formed in the shape of strips, can likewise be parallel to one another. This alternating arrangement can offer an improved spatial layout for the access of a tool to the cable clamping spring.

The rotated arrangement can also be provided block-wise, i.e. in groups of identically arranged spring elements, and non-alternating or block-wise, i.e. alternating in groups.

By means of a cable connecting clamp which has two or more parallel clamp connections, each of which is electrically connected to one of the identically shaped conductors, the corresponding advantages can be achieved in the connection of two or more electrical conductors to one cable clamp.

A connection element according to the invention can have a housing for the mechanical connection to an adjacent functional element or module and an electrical contact element for the electrical connection. In a special embodiment, the electrical contact element includes two or more spring elements as electric conductors having contact surfaces for the adjacent functional module, and a cable connecting clamp for two or more cable cores. Such a contact element can permit the connection of a plurality of cable cores parallel to a plurality of contact surfaces for an adjacent functional element. For example, in this way a plurality of functional elements or modules located one behind another can be electrically connected and activated.

The cable connecting clamps of the electrical contact elements are formed as cable clamping springs and are provided with two or more cable clamping springs for two or more cable cores. Thus, with the insertion of the cable ends into the cable clamping spring, the electrical connection as far as the contact surfaces for the adjacent functional module or modules can be produced via the electrical conductor as necessary.

As mentioned above, the two or more electrical conductors are designed as one-piece spring elements which each have a contact surface for the adjacent functional module and a cable clamping spring. Such a one-piece form simplifies the production by reducing the number of parts and mounting steps.

The contact element preferably has an electrically insulating material between the various cable clamping springs, as a result of which undesired contact between different conductors is made more difficult.

The contact element can be formed in one piece with the housing of the connection element or as an insert element for insertion into the housing of the connection element. For example, the insulating part of the contact element can be produced in the housing in the injection-molding process during the production of the housing from plastic. The contact element can likewise be produced as an insert element by injection-molding the insulation. In both cases, the electrical conductors can be inserted subsequently or overmolded at the same time. In the case of an embodiment formed in one piece with the housing, the number of production steps is smaller; in the case of the embodiment as an insert part, the same contact element can be used for different housing variants.

As already mentioned above, the connection element according to the invention is advantageously used in a signal device having changeable functional modules such as, for example, in a signal tower. In this case, an additional advantage can be achieved by one or more functional elements having a contact element which is formed in the same way as the contact element of the connection element. As a result, the same contact elements can be used not only between the connection element and the adjacent functional module or element but also between the functional modules or elements.

This can be implemented by the contact element having both a cable clamp for the cable ends and also connecting contacts for a functional module or element, for example for a printed circuit board of a functional module.

In a particularly advantageous embodiment, however, the cable connecting clamp of the connection element is configured in such a way that it optionally permits the connection of cable cores or of conductor D tracks of the printed circuit board to produce an electrical connection, and thus no separate connecting contacts are needed for a printed circuit board.

Thus, for example, the cable connecting clamp can have one or more openings for the insertion of a printed circuit board or for the insertion of projections of a printed circuit board, wherein the cable clamping springs are accessible through the opening or openings for the printed circuit board, in order optionally to produce the contact to the conductor tracks of the printed circuit board or a cable core or a ferrule of a cable core via the cable clamping springs,

BRIEF DESCRIPTION OF THE SEVERAL VIEWS OF THE DRAWINGS

Exemplary embodiments of the invention are illustrated in the drawing and will be explained in more detail below with reference to the figures.

In detail.

DETAILED DESCRIPTION OF THE INVENTION

Figure 1:
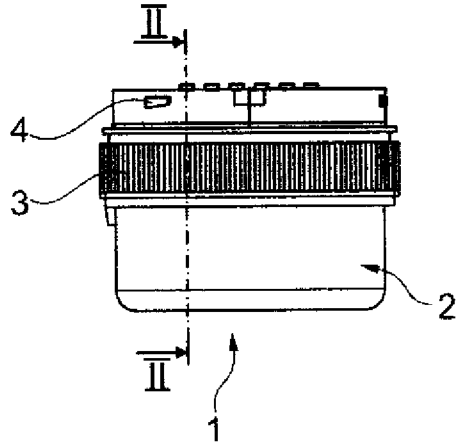
FIG. 1 shows a side view of a connection element according to the invention.
Figure 2:
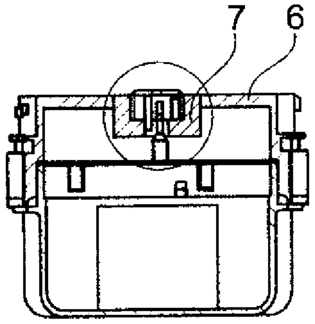
FIG. 2 shows a sectional illustration of a connection element according to the invention.

In detail, the connection element 1 according to FIG. 1 and FIG. 2 comprises a housing 2 having knurling 3 and projections 4 of a bayonet fixing 5 for a functional module that is to be placed thereon and is therefore adjacent. In the cover 6 of the connection module 1 there is a contact element 7, which can be formed in one piece with the housing 1 or the cover 6 or is connected to the cover 6 as an insert element.

Figure 3:
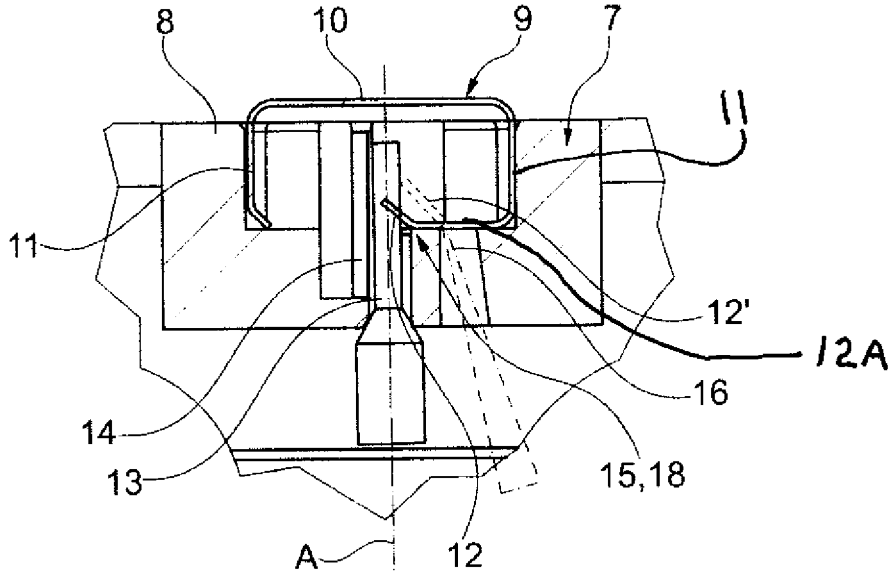
FIG. 3 shows a detail enlargement from FIG. 2 with a first embodiment of a spring element.

The contact element 7 can be seen more clearly 5 in the detail enlargement according to FIG. 3. The contact element comprises an electrically insulating receptacle 8, e.g. made of plastic, into which a spring element 9 is inserted as an electrical conductor. The spring element has on the upper side a contact surface 10 for the electrical connection of an adjacent functional element. The spring element is supported in the receptacle 8 via two side cheeks 11 and is anchored in a manner not specifically illustrated, for example by means of barbs, latching elements or the like.

On the underside, the spring element 9 comprises a cable clamping spring 12 which, in the deflected position 12' illustrated dashed, presses a ferrule 13 of a connecting cable against an abutment 14. Referring now to FIGS. 3, 4, 5, 9 and 12 the contact surface 10 has side checks 11 one of which terminates in a leg 12A that is parallel to the underside surface of the contact surface 10 before proceeding at an angle and terminating in an angle to provide the angled clamping spring 12. As a result of the angled configuration of the cable clamping spring 12, the ferrule 13 is clamped against withdrawal. The abutment 14 can consist of an insulating material, for example of plastic, or a conductive material, for example of metal.

A cable connecting clamp 15 for the ferrule 13 is thus formed by the receptacle 8, the cable clamping spring 12 and the abutment 14. In the exemplary embodiment illustrated, the necessary electric conductor in the form of the spring element 9 therefore extends not only from the contact surface 10 as far as the cable connecting clamp 15 but, as a result of the one-piece configuration of the spring element 9 with the cable clamping spring 12, it is also part of the cable connecting clamp 15.

A slot 16 in the receptacle 8 permits the insertion of a tool 17, illustrated dashed, for example in the form of a screwdriver, in order to force the cable clamping spring 12 away from the ferrule 13 and thereby to release the latter. As a result of this measure, the cable connecting clamp 15 is designed to be releasable.

As a result of the open shape of the spring element 9, the latter is also springy in the region of the contact surface 10, i.e. it forms a contact spring 18 on the upper side of the contact element 7 for the contact with a functional module that is adjacent thereto.

Figure 4:
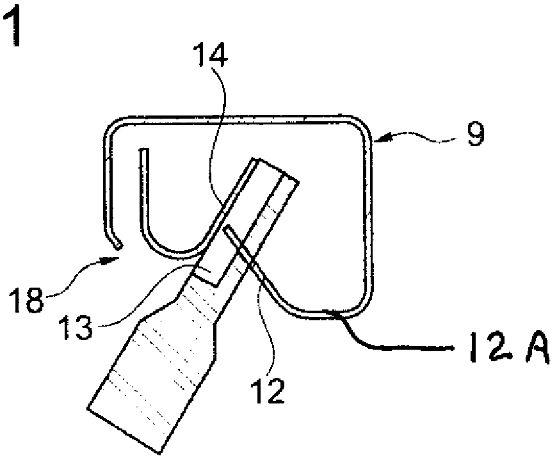
FIG. 4 shows a second embodiment of a spring element.

FIG. 4 shows another embodiment of the spring element 9 of the cable clamping spring 12 with a modified abutment 14. In the illustration, although the insertion direction of a ferrule, which is oblique here, is shown for the purpose of illustration, the cable clamping spring is in the non-deflected position, which corresponds to the position without a ferrule.

Figure 5:
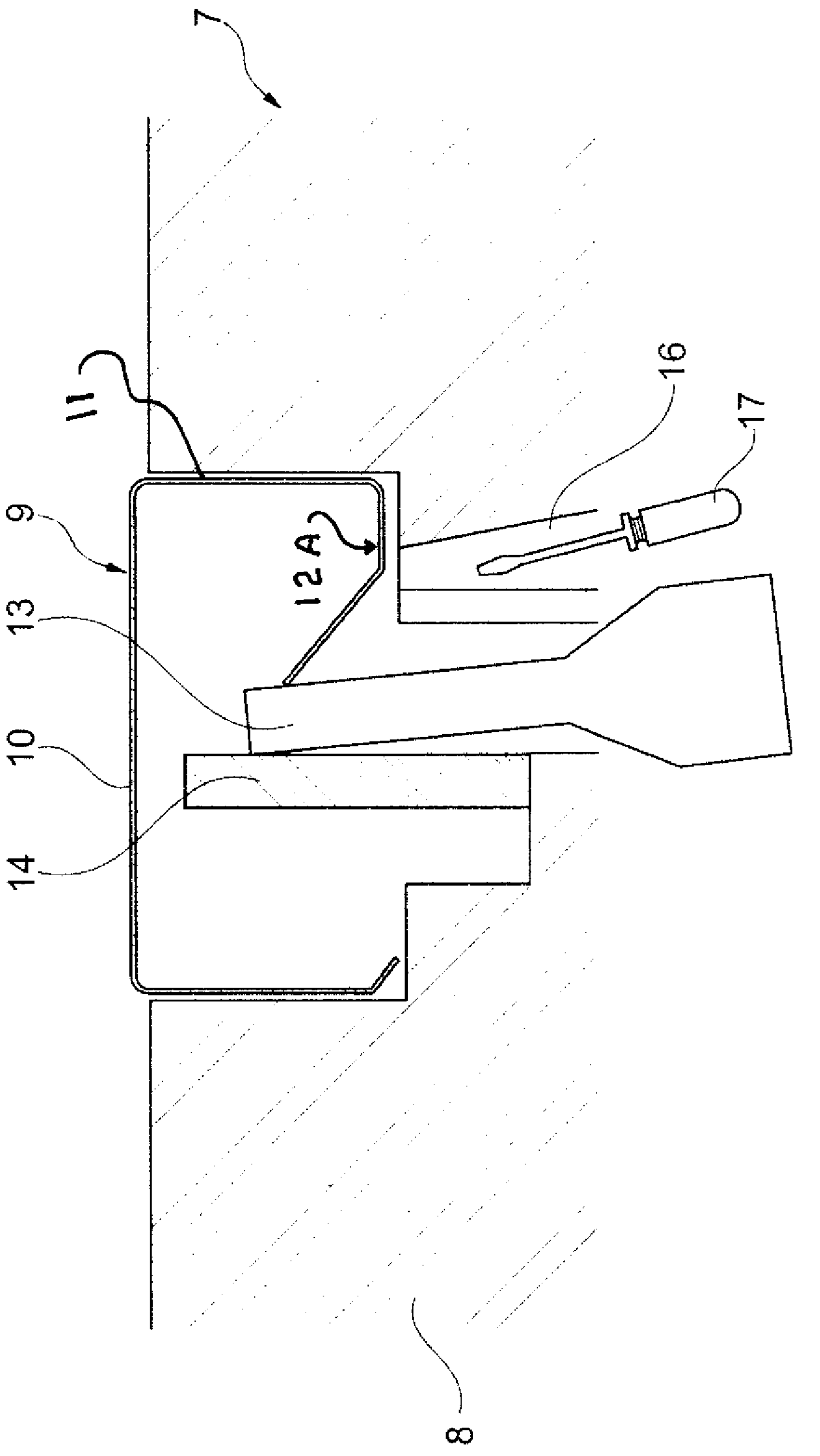
FIG. 5 shows a detail of a contact element with a further embodiment of a spring element.

FIG. 5 shows the variant of the contact element 7 according to FIG. 1, wherein the receptacle 8 is only partly illustrated. The tool 17 is only indicated and, in fact, is of course considerably larger. In this illustration, it can be seen that ferrules of different cross sections can be used. The ferrule illustrated is considerably narrower than the associated receiving opening 19 in the receptacle 8, so that an oblique insertion position is possible here. However, this illustration reveals that it would also be possible to use a ferrule 13 or else a wire end of a cable wire with a larger cross section.

Figure 6:
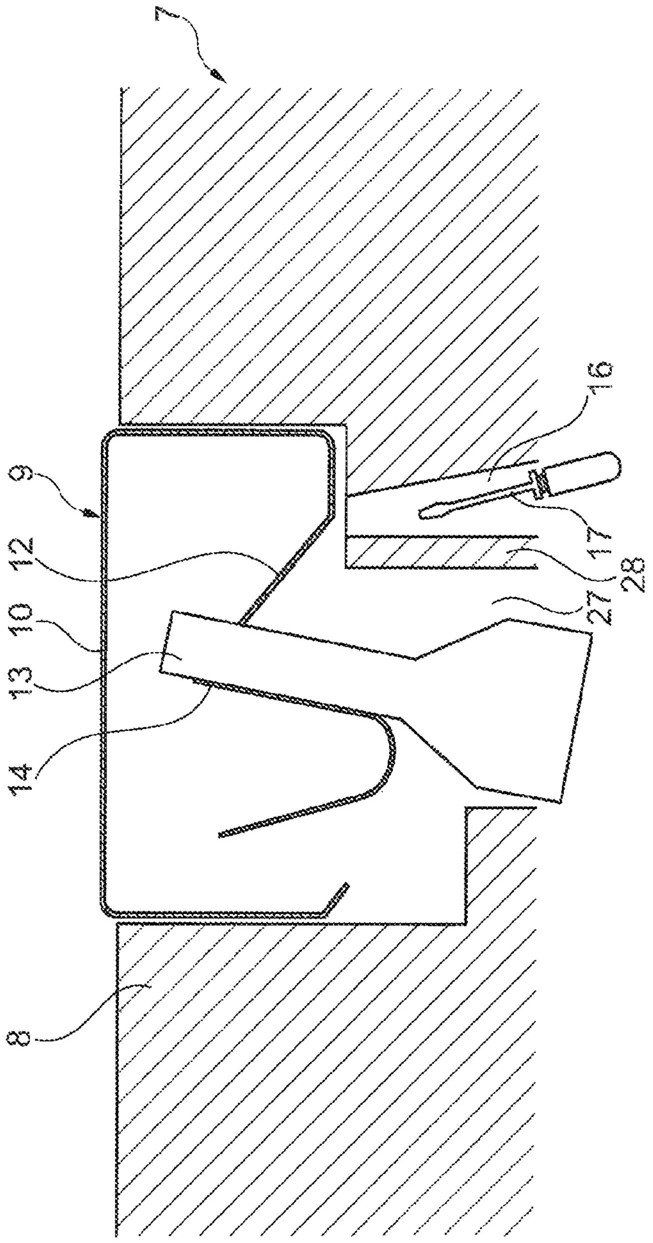
FIG. 6 shows a detail of a contact element with a further embodiment of a spring element.

FIG. 6 shows a similar variant to FIG. 4. In both cases, the abutment 14 is formed as an additional part, which is produced separately and is inserted into the receptacle 8.

Figure 7:
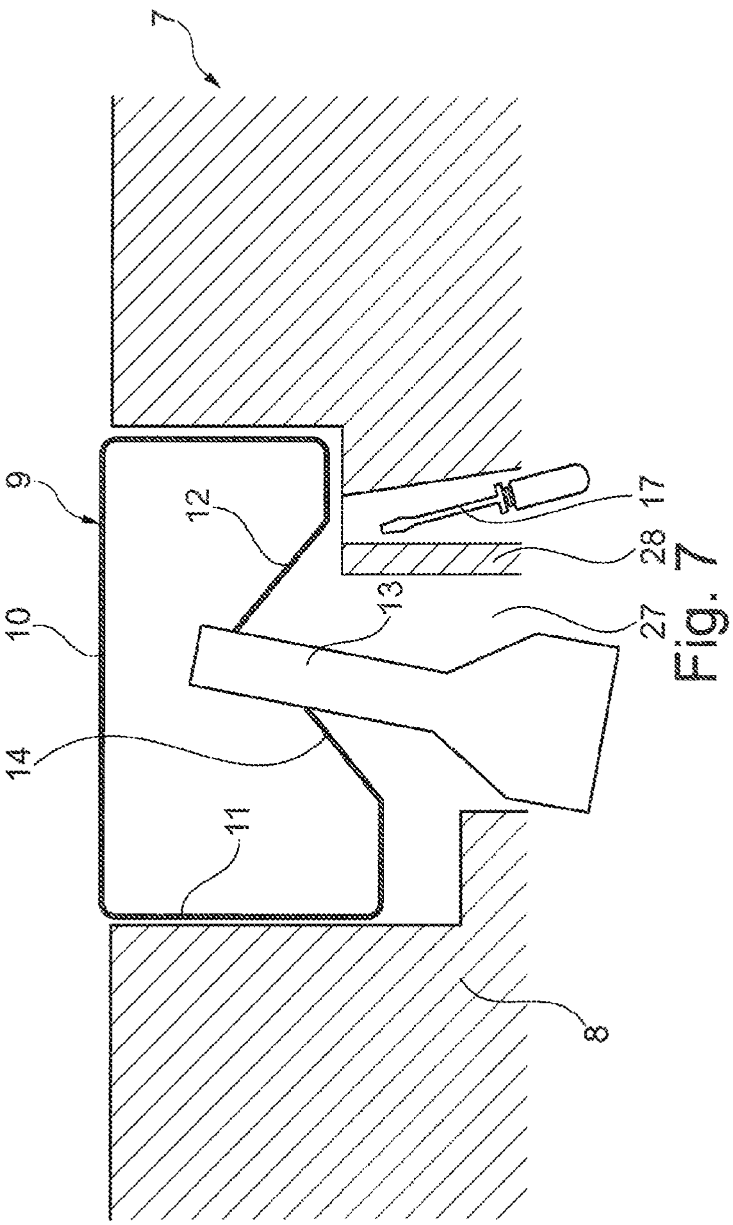
FIG. 7 shows a detail of a contact element with a further embodiment of a spring element.

FIG. 7 shows an embodiment in which the abutment 14 is formed in one piece with the spring element 9. Here, the abutment 14 is formed as an angled section from a side cheek 11 of the spring element. The abutment can likewise be formed as an elastic clamping spring or as a dimensionally stable abutment.

Figure 8:
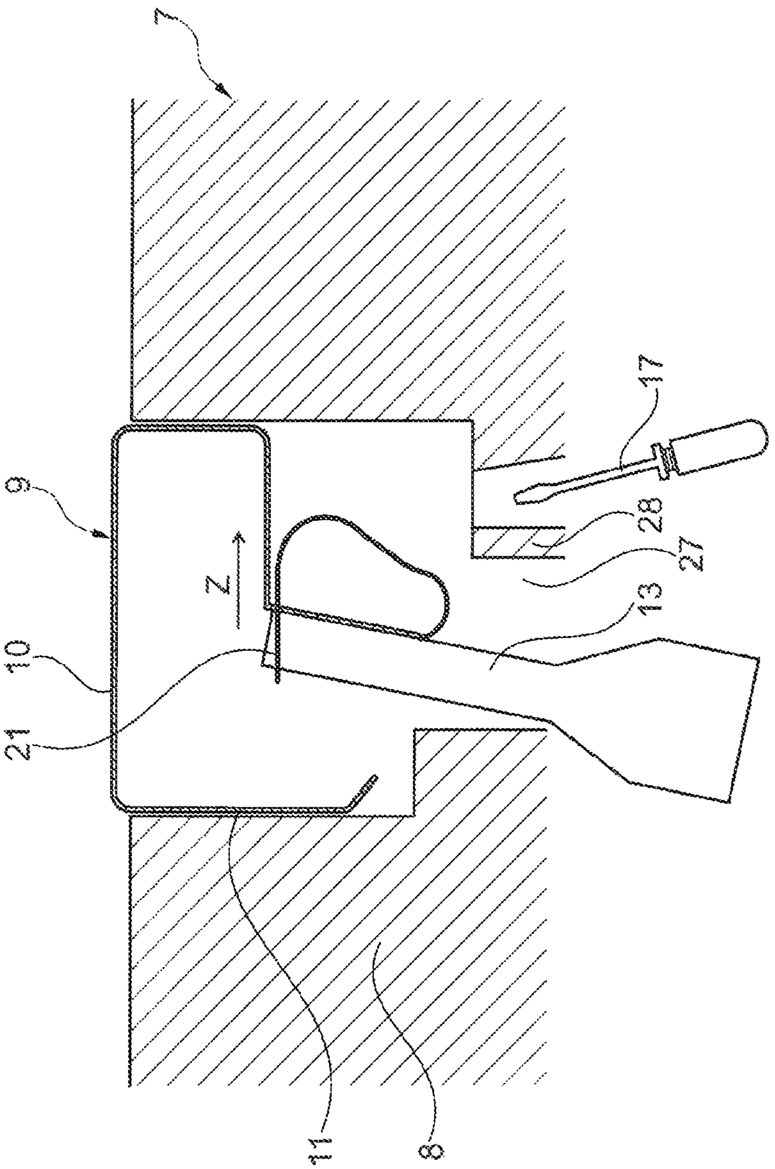
FIG. 8 shows a detail of a contact element with a further embodiment of a spring element.

FIG. 8 shows a variant in which the end of the spring element 9 forming the cable clamping spring is shaped such that it forms a clamping cage 19 and an abutment 20. The ferrule is pushed through an opening 21 in the clamping cage 19 and, as it springs back in the direction Z, is clamped in between the clamping cage 19 and the abutment 20. By means of the tool 17, the clamping cage can be pressed counter to the spring direction Z and thus the clamping of the ferrule 13 can be released again.

Figure 9:
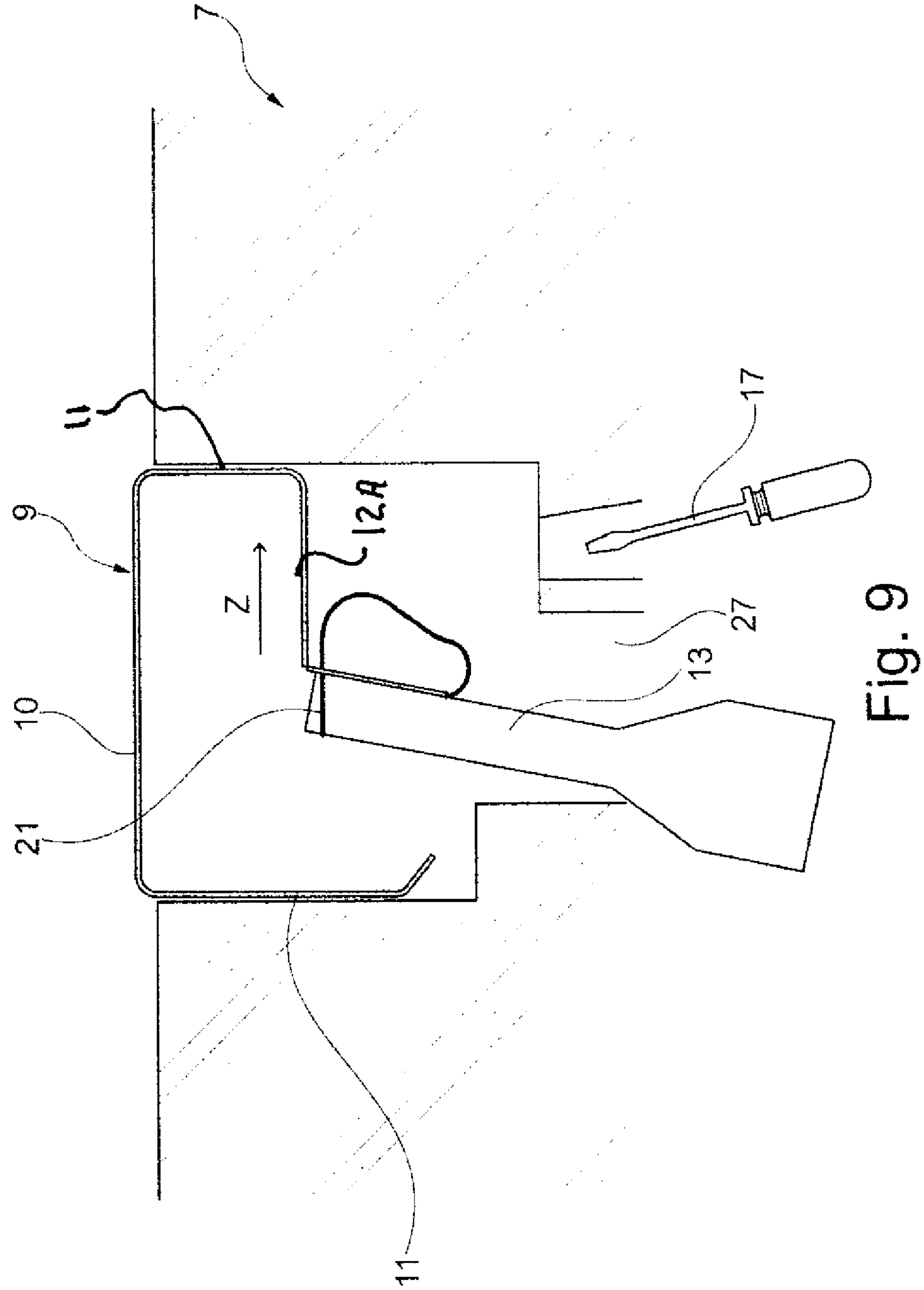
FIG. 9 shows a detail of a contact element with a further embodiment of a spring element.

The embodiment according to FIG. 9 corresponds substantially to the embodiment according to FIG. 8, here the clamping cage 19 being formed separately from the spring element 9 and thus being introduced into the receptacle 8 as an insert during the assembly.

Figure 10:
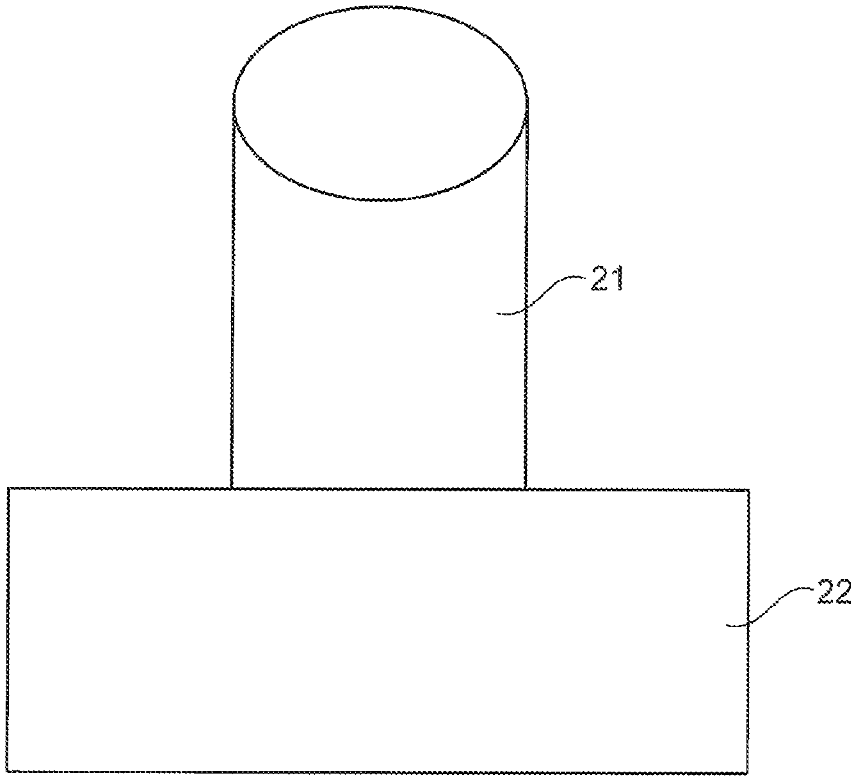
FIG. 10 shows a special embodiment of a spring element.

FIG. 10 shows a special exemplary embodiment relating to the configuration of the spring element 9. Here, the spring element 9 is shown only in part to illustrate the cross sections. In this design, the spring element is bent from a wire 21 having a round cross section and, in the region of the cable clamping spring, is flattened by an embossing 22, A comparable embossing or flattening can also be provided in the region of the contact surface 10.

Figure 11:
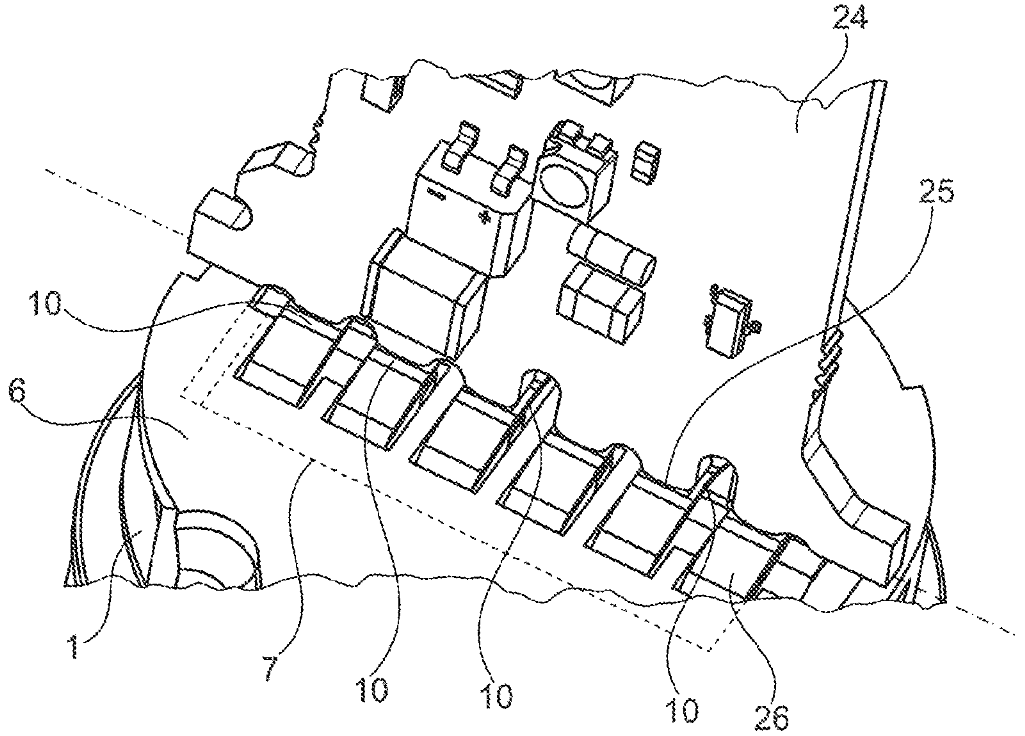
FIG. 11 shows a detail of a perspective illustration of a functional module and the contact surfaces thereof in contact with the printed circuit board of an adjacent functional module.

FIG. 11 shows the arrangement of six contact surfaces 10, which are strip-shaped and arranged parallel to one another. The contact surfaces 10 project from the cover 6 of the connection element 1, into which the contact element 7 is integrated, as indicated by dashed lines. A printed circuit board 24 is in electrical contact via end-face contacts 25 with the contact surfaces 10 of the contact element 7 of the connection element 1. The printed circuit board 24 belongs to an adjacent functional module, not illustrated further, which is connected one-to-one to the connection element 1 and is connected thereby.

This illustration not only reveals the function of the contact surfaces 10 but also illustrates the fact that the contact surfaces 10, apart from a flat shape as shown above, can also be formed as curved surfaces or as a plurality of flat surfaces arranged at an angle relative to one another, as a result of which it is possible to form ramps 26 for mating contacts of a functional module that is to be connected, on which these contacts can slide along.

Figure 12:
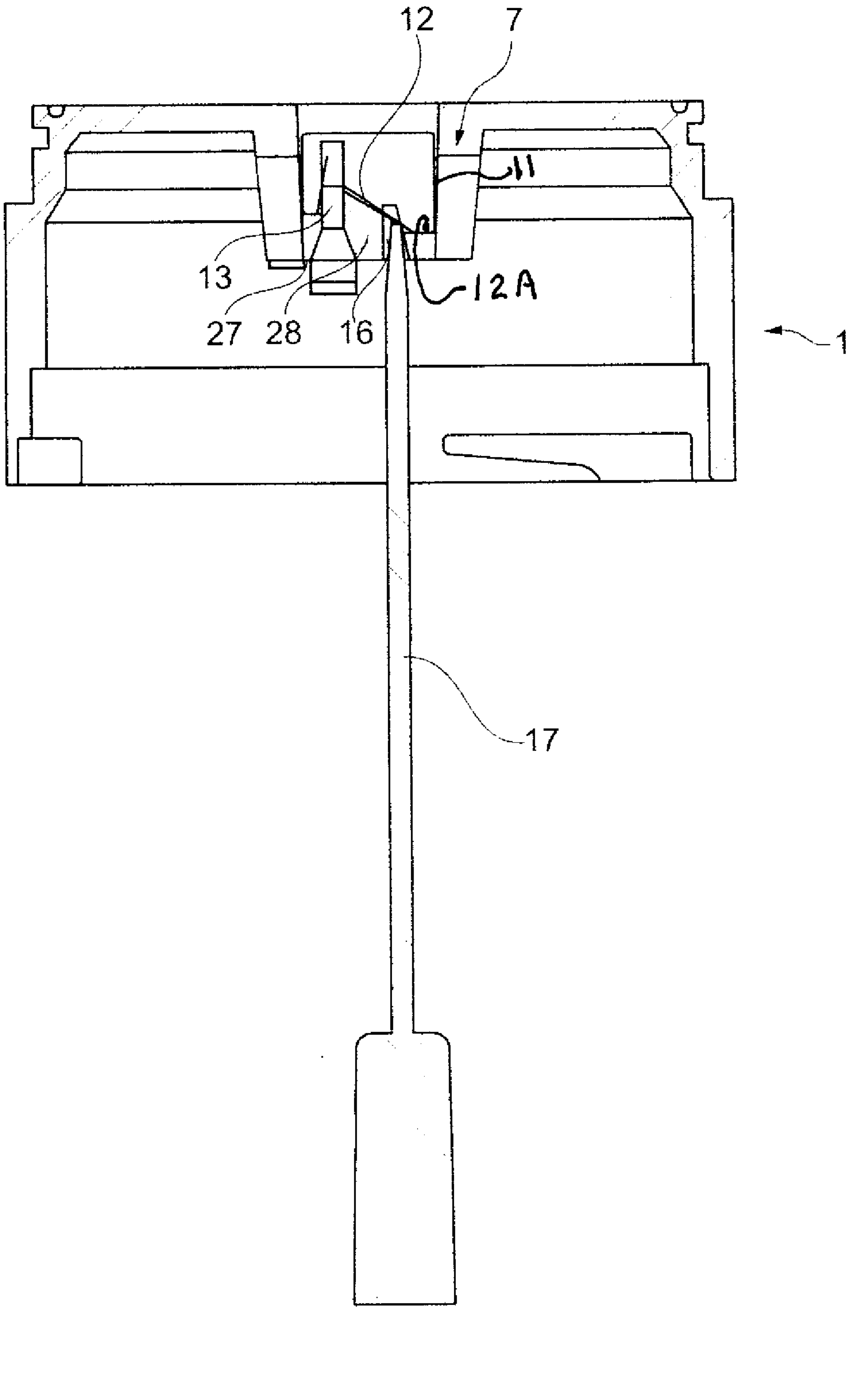
FIG. 12 shows a cross section through a further embodiment of a connection element.

FIG. 12 shows an embodiment of a contact element 7 in which the tool is guided into the slot 16 parallel to the ferrule 13 to release the cable clamping spring 12, the slot being designed to be separated from the receiving opening 27 for the ferrule 13 by a dividing wall 28, as in the preceding examples.

Figure 13:
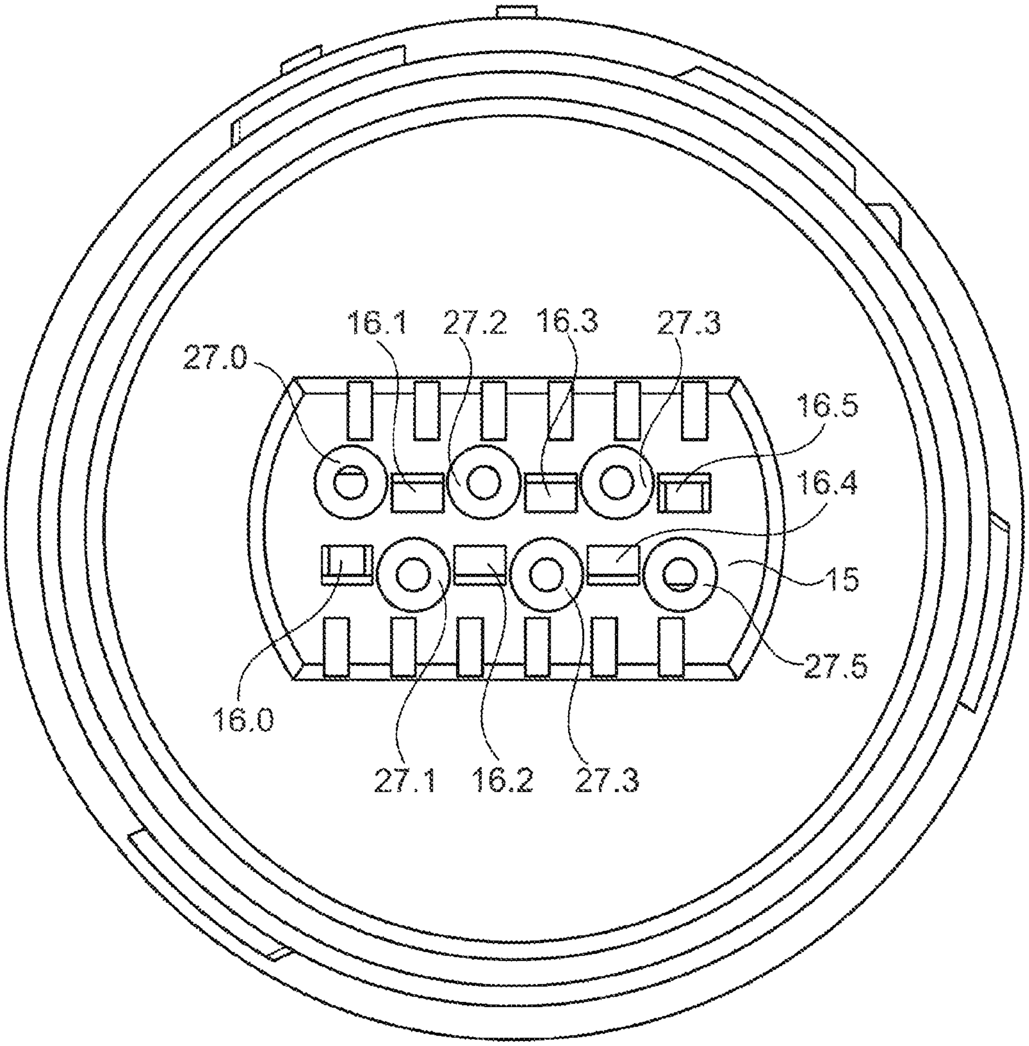
FIG. 13 shows a plan view from below of a connection element with cable connecting clamp.

In FIG. 13, by using the receiving openings 27 for the ferrules 13 and the slot 16 for the tool 17 for releasing the cable clamping springs 12, it can be seen that the respective associated spring elements 9 are arranged rotated alternately through 180°. The receiving openings 27 and slot 16 are numbered for this purpose, so that it is possible to see that the spring elements 9 belonging to the receiving openings 27.0, 27.2, 27.4 and the slots 16.0, 16.2 and 16.4 are alternately rotated as compared with the receiving openings 27.1, 27.3, 27.5 and the slots 16.1, 16.3 and 16.5.

Figure 14:
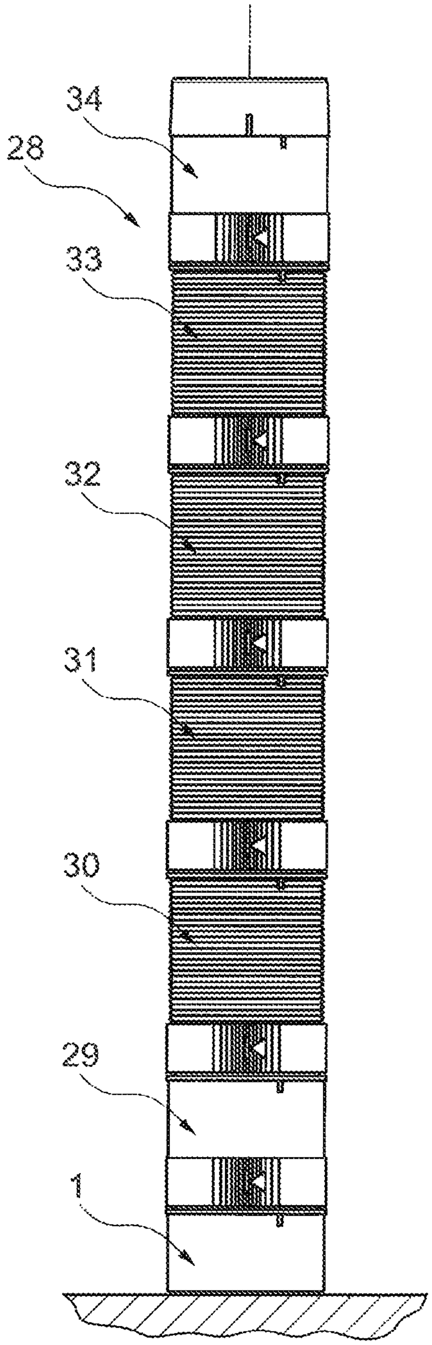
FIG. 14 shows a side view of a signal tower with a connection element and functional modules.
Figure 15:
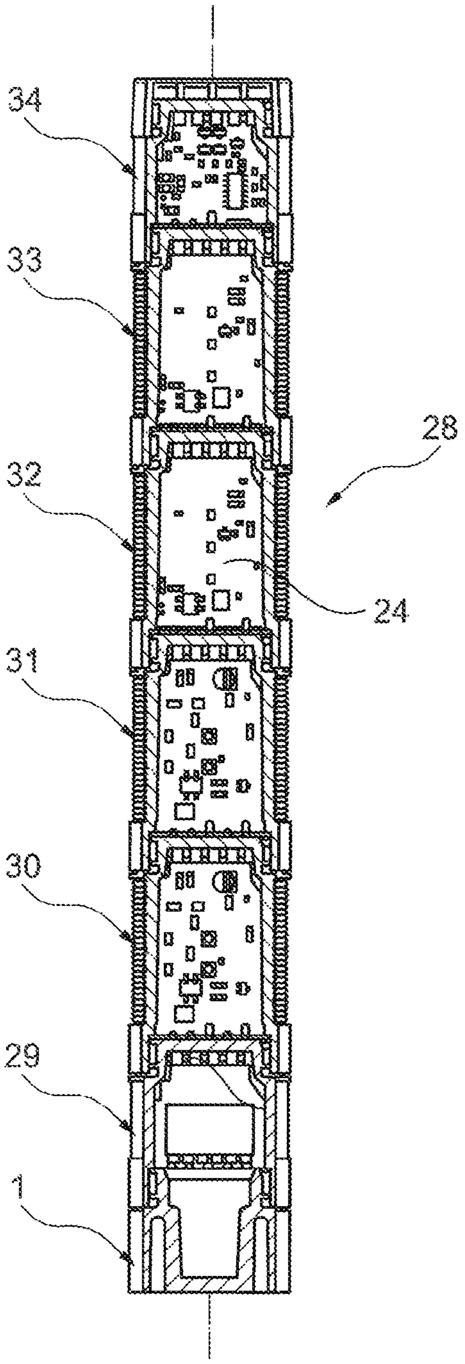
FIG. 15 shows an opened illustration of a signal tower according to FIG. 14.

Illustrated it. FIG. 14 and FIG. 15 is a signal tower which comprises various functional modules 29, 30, 31, 32, 33, 34 which, for example, can be configured as lighting modules, acoustic modules or radio modules. The connection element 1, not illustrated in these figures, is formed according to the invention and is used to connect the functional modules 29, 30, 31, 32, 33, 34 by means of cable cores, not illustrated. Printed circuit boards 24 can be seen in the sectioned illustration according to FIG. 15.

Figure 16:
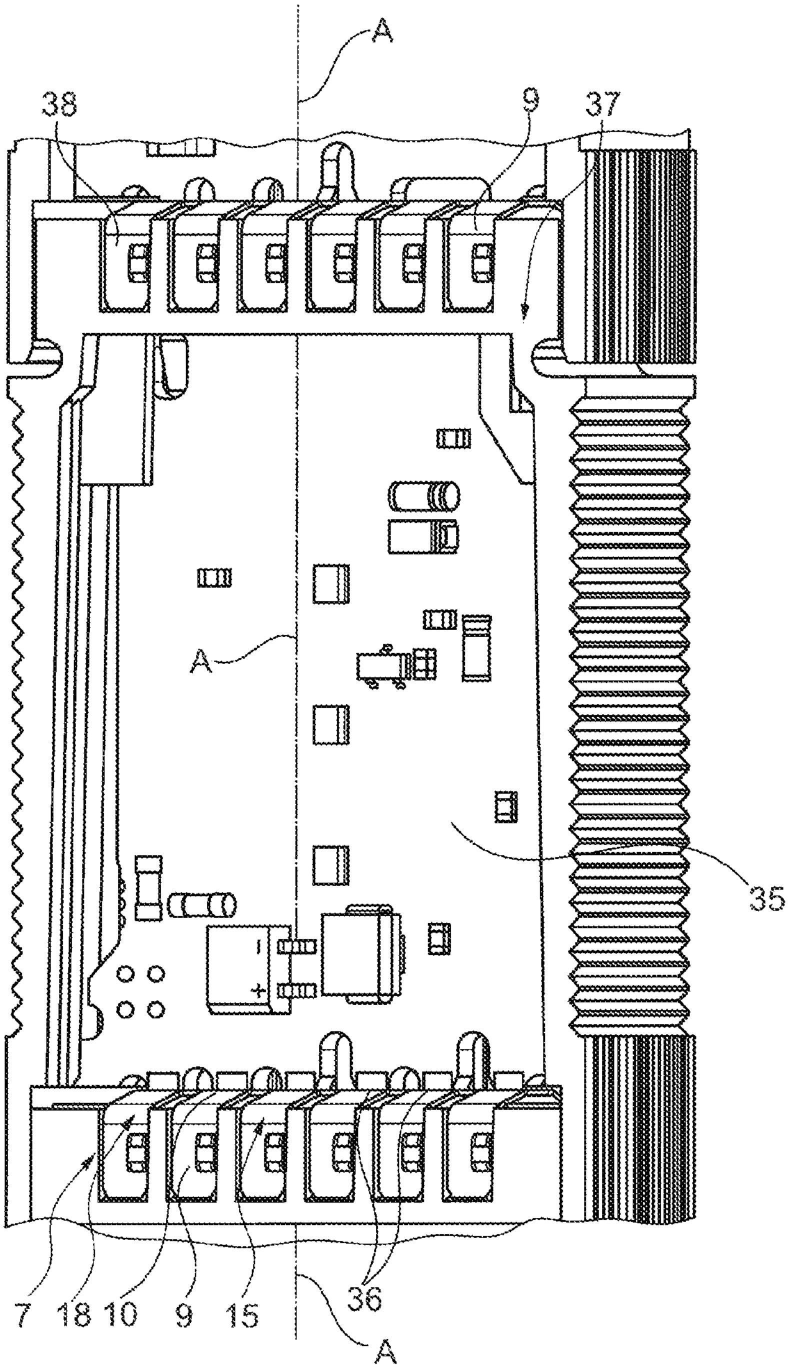
FIG. 16 shows an opened illustration of a functional module with a printed circuit board with the connection contacts to further functional modules or a connection element.

In FIG. 16, it is possible to see the connection of a functional module, for example the functional module 30 or 31 to 33. The printed circuit board 35 is provided on the lower end face with end-face contacts 36 in the form of electrically conductive contact surfaces which, as can be seen, extend transversely relative to the longitudinal axis A of the signal tower 28, to functional modules 29 to 34 and to the printed circuit board 35. These end-face contacts 36 form mating contacts to the contact surfaces 10, likewise transverse relative to the longitudinal axis A, of the contact springs 18 in the contact element 7 of a functional module 31 located underneath or of a connection element 1 located underneath.

On the upper side of the functional module 30 or 31 to 33, it is possible to see the contact element 37 belonging to the illustrated functional module., which is formed in the same way as the contact element 7. The printed circuit board 35 is inserted into the contact element from below. For this purpose, the printed circuit board 35 is configured in such a way that it can optionally be plugged into the receiving openings 27 instead of ferrules 13 and correspondingly contacts conductor tracks by using the spring elements 9. Thus, a printed circuit board 38 located above contacts a functional module that is located above or is adjacent in the same way as the printed circuit board 35 on its underside.

LIST OF DESIGNATIONS

1 Connection element
2 Housing
3 Knurling
4 Projection
5 Bayonet fixing
6 Cover
7 Contact element
8 Receptacle
9 Spring element/electrical conductor
10 Contact surface
11 Side cheek
12 Cable clamping spring
13 Ferrule
14 Abutment
15 Cable connecting clamp
16 Slot
17 Tool
18 Cable clamping spring
19 Clamping cage
20 Abutment
21 Opening
22 Wire
23 Embossing
24 Printed circuit board
25 End-face contact
26 Ramp
27 Receiving opening
28 Signal tower
29 Functional module
30 Functional module
31 Functional module
32 Functional module
33 Functional module
34 Functional module
35 Printed circuit board
36 End-face contacts
37 Contact element
38 Printed circuit board
A Longitudinal axis

What is claimed is:

1. A connection element (1) for the electrical connection of modules for a detachable and functional modular signal device comprising a cylindrical housing (2) with a mechanical connection and an electrical connection having a one piece electric conductor (9) with a contact surface (10) disposed at and parallel to a terminal end (12A) that ends or terminates in an angled clamp (12) of the connection element (1) said electric conductor being a one piece U-shaped spring element with two open arms facing away from the contact surface with one of the open arms forming the clamp (12) with part of the connection element for a cable core (13) of an electric cable in the clamp (12) formed between one of the open arms of the one piece electric conductor and the connection element (7) for the connection of a functional module and the cable core in the clamp (12) in the one piece U-shaped spring element between the two open arms facing away the contact surface (10) and wherein the clamp (12) has a clamp for only one surface of the cable core to allow opening of the clamp through a single clamp removal slot (16) in the connection element (7).

2. The connection element according to claim 1 further comprising a passage for the insertion of the cable core (13) of the cable in the clamp (12).

3. The connection element according to claim 1 further comprising a device for opening or loosening the clamp.

4. The connection element according to claim 1 further comprising an access in the housing (2) and single slot (16) in the connection element for a separate tool (17) for pressing the clamp (12) or a permanently present loosening element for pressing the clamp (12).

5. The connection element according to claim 1 wherein the contact surface (10) for an adjacent functional module is a contact spring (18) that springs transversely with respect to the contact surface (10) and acts in the direction of a longitudinal axis (A) of the connection element (1).

6. The connection element according to claim 1 wherein the contact spring (18) has the contact surface (10) for the adjacent functional module electrically connected to the clamp.

7. The connection element according to claim 1 wherein the clamp (15) of the connection element (1) permits the connection of the cable cores (13) or conductor tracks of a printed circuit board to produce an electrical connection.

8. The connection element according to claim 1 wherein the connection element has one or more openings for the insertion of a printed circuit board or for the insertion of projections of a printed circuit board.

9. The connection element according to claim 1 further comprising a contact element (7) having two or more spring elements (9) as electric conductors having contact surfaces (10) for an adjacent functional module and having a cable connecting clamp (15) in a receptacle (8) for two or more cable cores (13) wherein the cable connecting clamp (15) of the contact element (7) is provided with two or more cable clamps (12) at each terminal end of each cable connecting clamp (15) for connecting two or more cable cores (13).

10. The connection element according to claim 9 wherein the contact element (7) has an electrically insulating material between the various spring elements (9).

11. The connection element according to claim 9 wherein the contact element (7) is one piece with the cylindrical housing (2) of the connection element (1) or as an insert element for insertion into the housing (2) of the connection element (1).

12. A signal device for detachable and electromechanically interconnectable functional modules comprising:

(a) a connection element (1) with a circular terminal end having a plurality of electrically insulative openings each of which electrically insulative opening (8) is configured to receive a one piece U-shaped electrically conductive angled clamping spring (12) with a contact surface (10) facing toward and parallel to the circular terminal end of the connection element said U-shaped electrically conductive clamping spring having only one end terminating in an angled cable connecting ferrule clamp spring (12) angled toward an underside of the contact surface (10);

(b) a slot (16) disposed in the connection element communicating with each of the U-shaped electrically conductive clamping springs on the underside of the contact surface (10) and intermediate the underside of the contact surface (10) and the cable connecting clamp (15) of each of the one piece U-shaped electrically conductive clamping springs and;

(c) a plurality of cable cores (13) for each of the electrically conductive clamping springs disposed between the cable connecting clamp (15) and the underside of the contact surface (10) for the connection of the functional module and the angled cable clamping springs clamps (12) of the cable connecting clamp (15) wherein each slot communicates with each U-shaped electrically conductive clamping spring to allow the insertion of a tool (17) to open the only one end of the cable connecting clamp (15).

13. The signal device according to claim 12, further comprising a contact element (7) disposed between the U-shaped electrically conductive clamp spring (12) and the electrically insulative openings of the connection element (1).

14. The signal device according to claim 12 further comprising a second functional module with at least one printed circuit board (24, 35) aligned substantially in the direction of a longitudinal axis (A) of the signal device (28) having one or more end-face contacts (25, 36) extending transversely with respect to the longitudinal axis (A) conductively connected to a conductor track.

15. An interchangeable functional module signal device comprising:

(a) a first end of a functional module with at least one printed circuit board aligned substantially along a longitudinal axis (A) on the first end of the interchangeable modular signal device having one or more end-face contacts extending transversely with respect to the longitudinal axis (A) conductively connected to a conductor track of the printed circuit board;

(b) a second end of the functional module or connection element with a plurality of electrically insulative openings configured to receive a one piece U-shaped electrically conductive clamp spring with a contact surface facing toward and disposed parallel to the end of the functional module or a connective element with open arms facing away from the contact surface;

(c) an angled cable clamp to clamp only one portion of the surface of a cable disposed on one end of one of the open arms of the one piece U-shaped electrically conductive clamp that bends parallel to the contact surface and terminates in the angled clamp facing the underside of the contact surface for a connection of a second functional module; and (d) a release slot on the functional module communicating between an outside surface of the interchangeable modular signal device and the U-shaped electrically conductive clamp to open the U-shaped electrically conductive clamp to remove the cable.

* * * * *